(12) United States Patent
Jung et al.

(10) Patent No.: US 9,828,260 B2
(45) Date of Patent: Nov. 28, 2017

(54) SOFTENING APPARATUS

(71) Applicant: SAMSUNG ELECTRONICS CO., LTD., Suwon-si (KR)

(72) Inventors: Moon Il Jung, Suwon-si (KR); Hee-Jin Park, Suwon-si (KR); Soon Cheol Kweon, Seoul (KR); Da Eun Kim, Seoul (KR); Chang Bae Lim, Suwon-si (KR); In Jo Jeong, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 216 days.

(21) Appl. No.: 14/587,319

(22) Filed: Dec. 31, 2014

(65) Prior Publication Data
US 2015/0225260 A1    Aug. 13, 2015

(30) Foreign Application Priority Data

Feb. 11, 2014 (KR) ......................... 10-2014-0015313

(51) Int. Cl.
| | |
|---|---|
| *C02F 1/42* | (2006.01) |
| *C02F 1/461* | (2006.01) |
| *B01J 49/30* | (2017.01) |
| *B01J 49/75* | (2017.01) |
| *C02F 103/00* | (2006.01) |

(52) U.S. Cl.
CPC ............... *C02F 1/42* (2013.01); *B01J 49/30* (2017.01); *B01J 49/75* (2017.01); *C02F 1/4618* (2013.01); *C02F 2001/425* (2013.01); *C02F 2001/46157* (2013.01); *C02F 2001/46161* (2013.01); *C02F 2001/46171* (2013.01); *C02F 2001/46185* (2013.01); *C02F 2103/002* (2013.01); *C02F 2201/46115* (2013.01); *C02F 2303/16* (2013.01)

(58) Field of Classification Search
CPC .... C02F 1/42; C02F 1/4618; C02F 2001/425; C02F 2001/46185; C02F 2201/46115; C02F 2303/16; B01J 49/30; B01J 49/75
USPC .......................................... 210/670; 204/632
See application file for complete search history.

(56) References Cited

U.S. PATENT DOCUMENTS

| | | | |
|---|---|---|---|
| 5,900,127 A | * | 5/1999 | Iida .................... C02F 1/46109 204/280 |
| 6,423,205 B1 | | 7/2002 | Akahori et al. |
| 2013/0098819 A1 | | 4/2013 | Rolfes |

FOREIGN PATENT DOCUMENTS

| | | |
|---|---|---|
| EP | 0 867 224 A2 | 9/1998 |
| EP | 0 867 224 A3 | 12/1998 |

(Continued)

OTHER PUBLICATIONS

Machine Language Translation of the detailed description of JP2009-165955A obtained from the J-Plat Pat website 03-0302017, 8 pages.*

(Continued)

*Primary Examiner* — Matthew O Savage
(74) *Attorney, Agent, or Firm* — Staas & Halsey LLP

(57) ABSTRACT

A softening apparatus in which resistance applied between electrodes is decreased to reduce power consumption. The softening apparatus includes a regeneration unit and a softening unit. The regeneration unit includes at least one anode and cathode in a first space which generate regeneration water containing hydrogen ions (H+). The softening unit is disposed in a second space partitioned from the first space and includes an ion exchange body regenerated by the regeneration water.

15 Claims, 15 Drawing Sheets

(56) References Cited

FOREIGN PATENT DOCUMENTS

| EP | 2 857 572 A1 | | 4/2015 | |
|----|---|---|---|---|
| JP | 2001-340863 | | 12/2001 | |
| JP | 2003-053339 | | 2/2003 | |
| JP | 2009165955 A | * | 7/2009 | ............... C02F 1/42 |
| JP | 2010-63988 | | 3/2010 | |
| JP | 2011-030973 | | 2/2011 | |

OTHER PUBLICATIONS

Machine Language Translation of the detailed description of JP2003-053339A obtained from the J-Plat Pat website on Mar. 3, 2017, 8 pages.*
European Search Report dated Jun. 17, 2015 in corresponding European Patent Application No. 15153696.8.

* cited by examiner

SOFTENING APPARATUS

CROSS-REFERENCE TO RELATED APPLICATIONS

This application claims the benefit of Korean Patent Application No. 10-2014-0015313, filed on Feb. 11, 2014 in the Korean Intellectual Property Office, the disclosure of which is incorporated herein by reference.

BACKGROUND

1. Field

Embodiments of the present disclosure relate to a softening apparatus that is regenerated using an electrochemical method.

2. Description of the Related Art

When detergent is used to remove non-polar contaminants from electric home appliances (a washer, a dishwasher, etc.) using water, cleaning performance may be deteriorated due to hardness of the water and the electric home appliances may be contaminated due to microorganisms propagating in the water and a scale component.

In order to prevent cleaning performance from being deteriorated due to hardness of the water, a heater may be used to increase solubility of the detergent, a hardness component may be removed using an ion exchange method, or electrochemical capacitive deionization (CDI) using electrostatic attractive force of an ion component may be applied. However, these methods do not fundamentally remove a hardness component ($Ca^{2+}$ or $Mg^{2+}$) with the result that the hardness component may be deposited on an object to be washed or a complicated system may be used to remove the hardness component. In this case, however, material costs may be increased and high energy may be needed.

Ion exchange resin using an ion exchange method is relatively inexpensive and convenient. When the ion exchange resin is regenerated for repetitive use, however, a high-concentration sodium chloride solution (NaCl) is used. As a result, actual application to the system is limited due to user inconvenience and environmental regulations due to regenerated waste water.

In order to prevent the cleaning system from being contaminated due to microorganisms, various methods, such as high-temperature sterilization, decolorant ion sterilization, and negative ion sterilization, may be used. However, these methods may require high energy and cause user inconvenience due to use of additional consumable chemicals. In addition, actual application to the system is limited due to environmental regulations. For contamination due to the scale component, there are insufficient solutions.

Attempts have been made to generate hydrogen ions (H+) through electrolysis such that the hydrogen ions may be used during a regeneration process. In this case, however, when electric charges are applied, larger resistance is applied between electrodes with the increase of a gap between the electrodes.

SUMMARY

It is an aspect of the present disclosure to provide an electrochemical softening apparatus that is relatively convenient and inexpensive.

It is an aspect of the present disclosure to provide a softening apparatus configured such that an ion exchange body is not disposed between electrodes to reduce a gap between the electrodes.

It is a further aspect of the present disclosure to provide a softening apparatus having porous or mesh electrodes to easily diffuse hydrogen ions (H+).

Additional aspects of the disclosure will be set forth in part in the description which follows and, in part, will be obvious from the description, or may be learned by practice of the disclosure.

In accordance with an aspect of the present disclosure, a softening apparatus includes a regeneration unit including at least one anode and cathode in a first space, the regeneration unit to generate regeneration water containing hydrogen ions (H+), and a softening unit disposed in a second space partitioned from the first space, the softening unit having an ion exchange body regenerated by the regeneration water. The softening apparatus may also include a power supply unit to supply power to the anode and cathode.

The first space and the second space may be partitioned from each other at the anode as a boundary.

The ion exchange body may be disposed in the second space such that the ion exchange body is coupled to one side of the anode via a binder.

The binder may be at least one selected from a group consisting of an inorganic binder and a porous binder.

The first space and the second space may be provided in one housing.

The ion exchange body may include at least one selected from a group consisting of an organic compound including an ion exchange resin, an inorganic compound including zeolite, and a hybrid compound constituted by a mixture of the organic compound and the inorganic compound.

The regeneration unit may further include at least one diaphragm disposed between the anode and the cathode to selectively transmit ions.

The diaphragm may include at least one selected from a group consisting of non-woven fabric, membrane, and positive ion exchange film.

The first space may be divided into a plurality of sub spaces by pluralities of anodes and cathodes.

The anode and the cathode may be formed in a plate shape or a circular shape.

The softening apparatus may further include a channel unit to move generation water generated in the first space to the second space.

The anode may be formed in a porous shape or a mesh shape.

The anode may be made of an ion exchange material.

BRIEF DESCRIPTION OF THE DRAWINGS will become apparent and more readily appreciated from the following description of the embodiments, taken in conjunction with the accompanying drawings of which:

DETAILED DESCRIPTION

Figure 1:
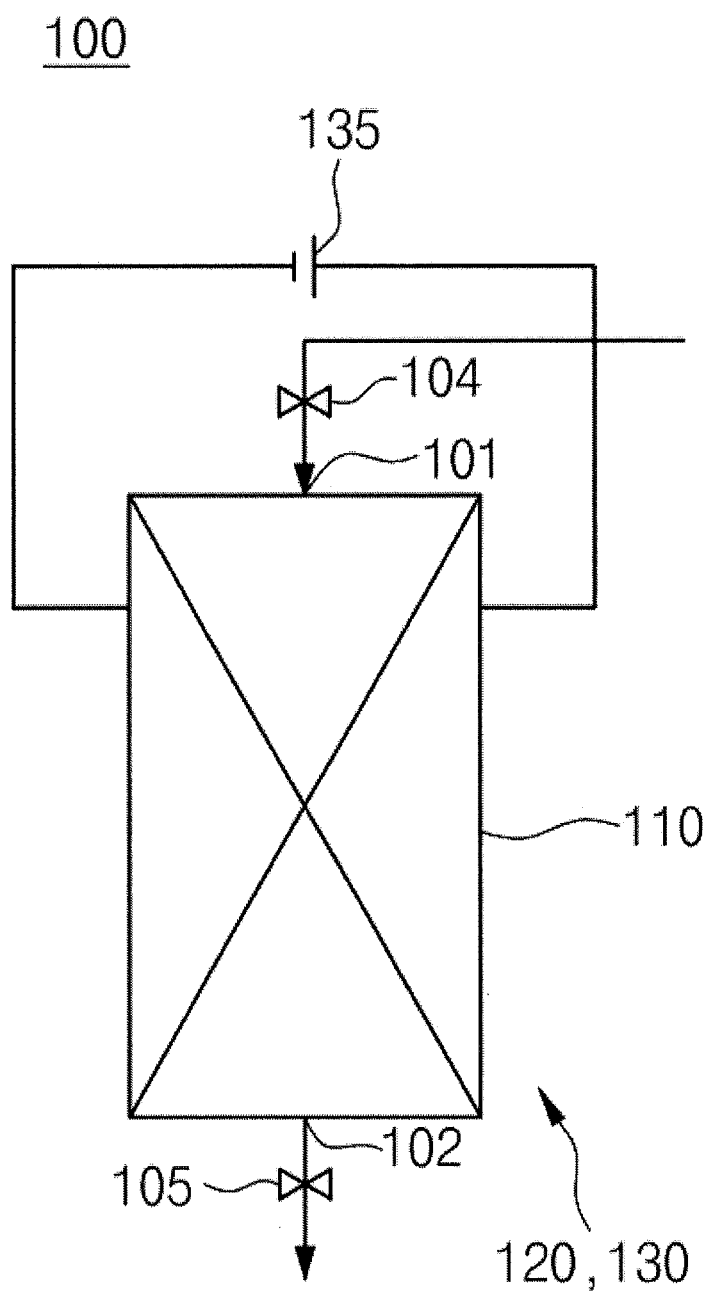
FIG. 1 is a view showing construction of a softening apparatus including a pair of plate-shaped electrodes according to an embodiment of the present disclosure.

Reference will now be made in detail to the embodiments of the present disclosure, examples of which are illustrated in the accompanying drawings, wherein like reference numerals refer to like elements throughout.

Embodiments of the present disclosure relate to a softening apparatus that softens raw water containing a hardness component. For convenience of description, the present disclosure describes different forms of water as follows: water containing a hardness component introduced into the softening apparatus is referred to as raw water; raw water, from which the hardness component has been removed, discharged from a softening unit is referred to as soft water; water having a high concentration of hydrogen ions (H+), generated by an anode during electrolysis, and supplied to an ion exchange body is referred to as regeneration water; water having a high concentration of hydroxyl ions (OH−), generated by a cathode during electrolysis, and discharged from the softening apparatus is referred to as alkaline water; and regeneration water having a high concentration of a hardness component provided in a regeneration process is referred to as condensed water. The hardness component may include positive ions, such as calcium ions (Ca2+) or magnesium ions (Mg2+), having positive charges. Hereinafter, a description will be given on the assumption that the hardness component includes calcium ions (Ca2+) or magnesium ions (Mg2+) for the convenience of description.

Hereinafter, embodiments of the present disclosure will be described in detail with reference to the accompanying drawings.

Figure 2:
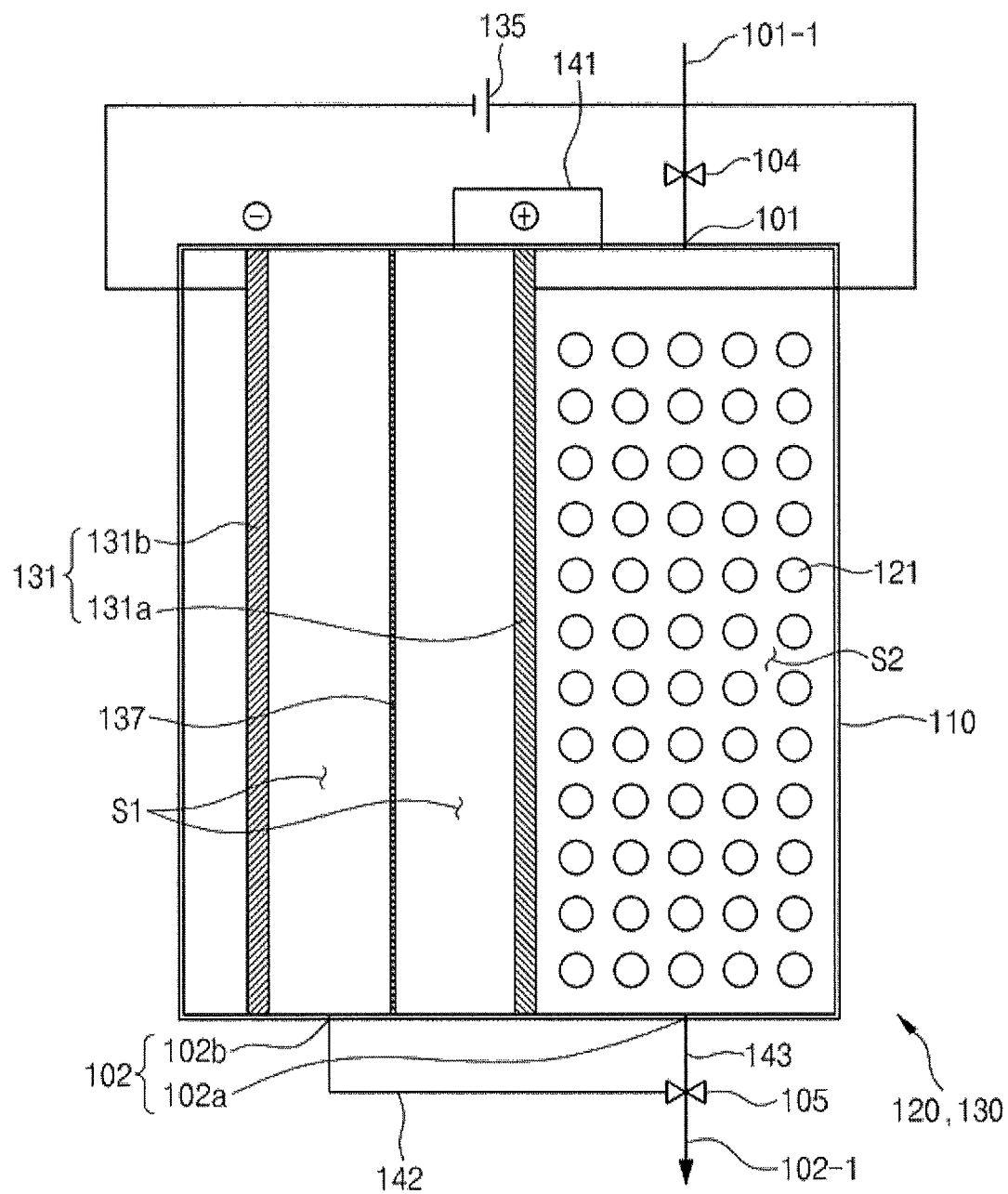
FIG. 2 is a sectional view of the softening apparatus shown in FIG. 1.

FIG. 1 is a view showing construction of a softening apparatus 100 including a pair of plate-shaped electrodes 131 (see FIG. 2) according to an embodiment of the present disclosure and FIG. 2 is a sectional view of the softening apparatus 100 shown in FIG. 1.

Referring to FIGS. 1 and 2, the softening apparatus 100 includes a housing 110 having an inlet port 101 and an outlet port 102 (102a and 102b), a regeneration unit, or regenerator, 130 to regenerate an ion exchange body 121 using hydrogen ions (H+) generated during electrolysis of water, a softening unit, or softener, 120 having the ion exchange body 121 to convert raw water into soft water, and channel units 141, 142, and 143 to guide regeneration water, alkaline water, and condensed water generated by the regeneration unit 130 and soft water generated by the softening unit 120.

The regeneration unit 130 and the softening unit 120 are provided for regeneration and softening, respectively. The regeneration unit 130 and the softening unit 120 may be separated from each other. In this embodiment, however, a softening and regeneration device is integrally formed in the housing 110. Consequently, the softening and regeneration device may be referred to as the regeneration unit 130 when performing a regeneration process and as the softening unit 120 when performing a softening process. Hereinafter, the respective elements of the softening apparatus 100 will be described in more detail.

The housing 110 includes an inlet port 101 connected to a raw water pipe 101-1 to allow raw water to be introduced therethrough and an outlet port 102 (102a and 102b) connected to a water discharge pipe 102-1 to allow soft water, etc. to be discharged therethrough.

The inlet port 101 may be formed at the top of the housing 110 and the outlet port 102 (102a and 102b) may be formed at the bottom of the housing 110. The outlet port 102 may include a first outlet port 102a to allow soft water generated during the softening process or condensed water generated during the regeneration process to be discharged therethrough and a second outlet port 102b to allow alkaline water generated during the regeneration process to be discharged therethrough. The inlet port 101 and the outlet port 102 (102a and 102b) are respectively provided with valves 104 and 105 to allow or block flow of raw water to be introduced through the inlet port 101 and soft water, etc. to be discharged through the outlet port 102 (102a and 102b).

The regeneration unit 130 is an element to electrolyze raw water to remove impurities, such as a hardness component (Ca2+ or Mg2+), from the ion exchange body 121. More specifically, the regeneration unit 130 supplies hydrogen ions (H+) generated during electrolysis of water to the ion exchange body 121 to regenerate the ion exchange body 121.

The regeneration unit 130 may include electrodes 131 to electrolyze raw water, a power supply unit, or power supply assembly, 135 to supply power to the electrodes 131, and a diaphragm 137 provided between the electrodes 131 to selectively transmit ions.

The electrodes 131 may include one or more plate-shaped or circular anodes 131a and one or more plate-shape or circular cathodes 131b. In FIG. 2, there are shown one anode 131a and one cathode 131b each formed in a plate shape by way of example. Generally, the electrodes 131 are made of a conductive material. In this embodiment, the electrodes 131 may be made of an ion exchange material in addition to the conductive material.

Referring to FIG. 2, a first space S1 is defined between the plate-shaped anode 131a and the plate-shaped cathode 131b, which are spaced apart from each other. The first space S1 is a narrow space provided between the anode 131a and the cathode 131b such that water containing hydrogen ions (H+) generated by the anode 131a or hydroxyl ions (OH−) generated by the cathode 131b passes therethrough.

As the size of the first space S1 increases or the first space S1 is filled with a large amount of the ion exchange body 121, larger resistance is applied between the electrodes 131, resulting in the increase of power consumption. In this embodiment, therefore, the softening apparatus 100 is designed such that the first space S1 is narrow sufficient to allow water to pass therethrough and the ion exchange body 121 is not provided in the first space S1. As a result, resistance applied between the anode 131a and the cathode 131b is remarkably lowered, thereby reducing power consumption.

The diaphragm 137 is disposed in the first space S1 between the anode 131a and the cathode 131b to divide the first space S1 into a plurality of sub spaces. In this embodiment, one anode 131a and one cathode 131b are disposed in the first space S1 and, therefore, the first space S1 may be divided into two sub spaces.

The diaphragm 137 selectively transmits ions. More specifically, the diaphragm 137 may selectively transmit positive ions to prevent a mixture of hydroxyl ions (OH−) generated by the cathode 131b and hydrogen ions (H+) generated by the anode 131a from being supplied to the ion exchange body 121. In this embodiment, the diaphragm 137 may include at least one selected from a group consisting of non-woven fabric, membrane, and positive ion exchange film.

The softening unit 120 is an element to remove a hardness component (Ca2+ or Mg2+) from raw water introduced through the inlet port 101 to soften the raw water. The softening unit 120 may be integrally formed with or separated from the regeneration unit 130. In FIGS. 1 and 2, the softening unit 120 is integrally formed with the regeneration unit 130.

Referring to FIG. 2, the softening unit 120 may be provided in a second space S2 partitioned from the first space S1. More specifically, the second space S2 is partitioned from the first space S1 at the anode 131a as a boundary. The ion exchange body 121 is disposed in the second space S2. As a result, resistance applied between the electrodes 131 may be minimized. In this embodiment, the ion exchange body 121 may be coupled to one side of any one of the electrodes 131, specifically the outside of the anode 131a via a binder. At least one selected from a group consisting of an inorganic binder and a porous binder may be used as the binder to increase the ion exchange amount of the ion exchange body 121.

At least one selected from a group consisting of an organic compound including an ion exchange resin, an inorganic compound including zeolite, and a hybrid compound constituted by a mixture of the organic compound and the inorganic compound may be used as the ion exchange body 121. In embodiments of the present disclosure, the resistance applied between the electrodes 131 is minimized to reduce power consumption. To this end, the ion exchange body 121 may be made of a material that reduces the resistance between the anode 131a and the cathode 131b when power is supplied to the electrodes.

The channel units 141, 142, and 143 may guide soft water generated by the softening unit 120 or generation water, condensed water, and alkaline water generated by the regeneration unit 130. Referring to FIG. 2, during the regeneration process, acid regeneration water containing hydrogen ions (H+) may be generated by the anode 131a and alkaline water containing hydroxyl ions (OH−) may be generated by the cathode 131b in the first space S1. Condensed water containing a hardness component (Ca2+ or Mg2+) may be generated in the second space S2. During the softening process, on the other hand, soft water containing hydrogen ions (H+) may be generated in the second space S2. The channel units 141, 142, and 143 may guide soft water, etc. generated by the softening apparatus 100 such that the soft water, etc. are properly supplied as described above.

The channel units 141, 142, and 143 may include a first channel unit 141, a second channel unit 142, and a third channel unit 143. The first channel unit 141 guides regeneration water generated by the anode 131a in the first space S1 during the regeneration process to be supplied to the second space S2. The second channel unit 142 guides alkaline water generated by the cathode 131b in the first space S1 during the regeneration process to be discharged outside. The third channel unit 143 guides condensed water generated in the second space S2 during the regeneration process to be discharged outside or soft water generated in the second space S2 during the softening process to be properly supplied as described above.

Hereinafter, softening and regeneration processes of the softening apparatus 100 shown in FIG. 2 will be described in detail.

Figure 3:
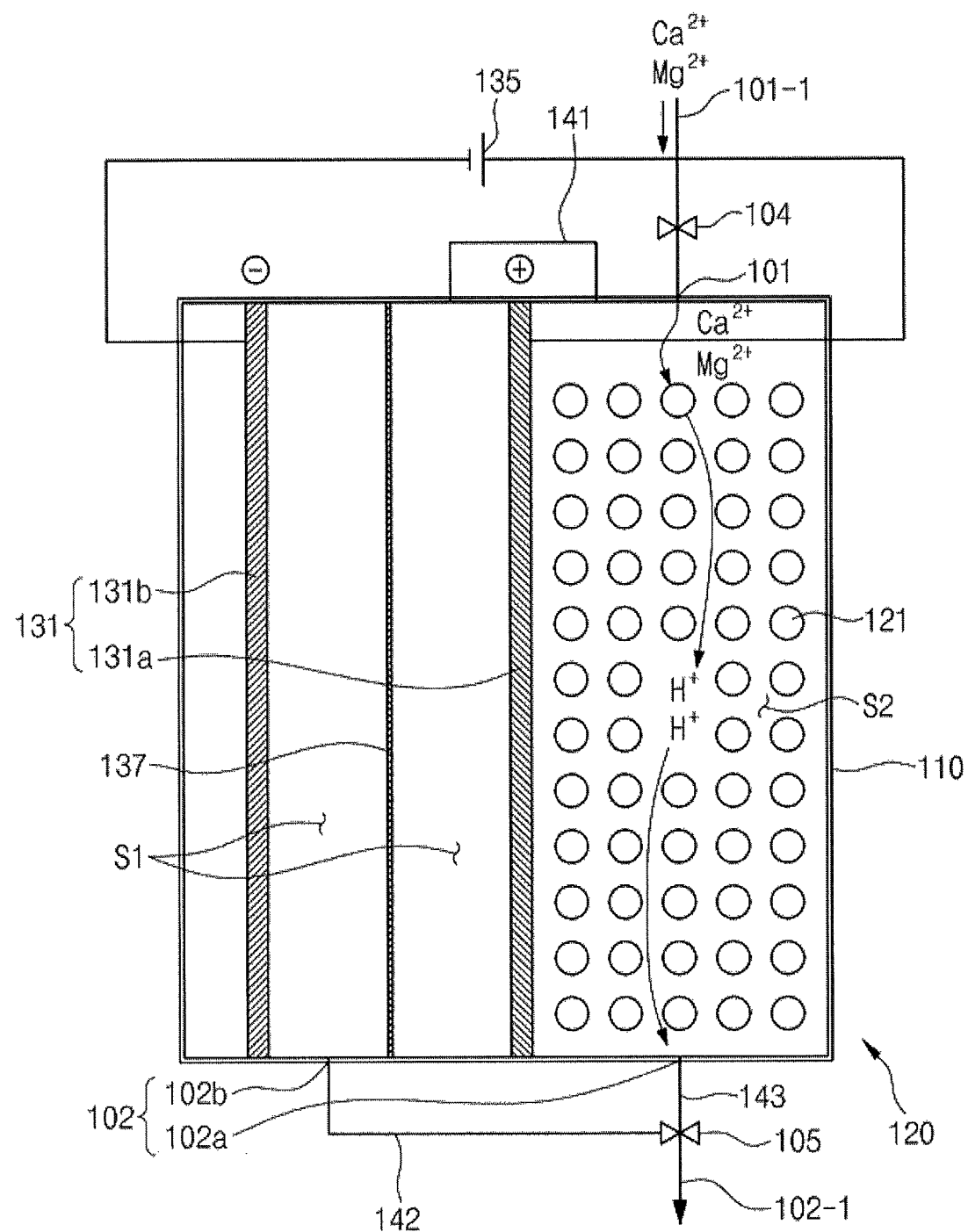
FIGS. 3 and 4 are views showing softening and regeneration processes of the softening apparatus shown in FIGS. 1 and 2.
Figure 4:
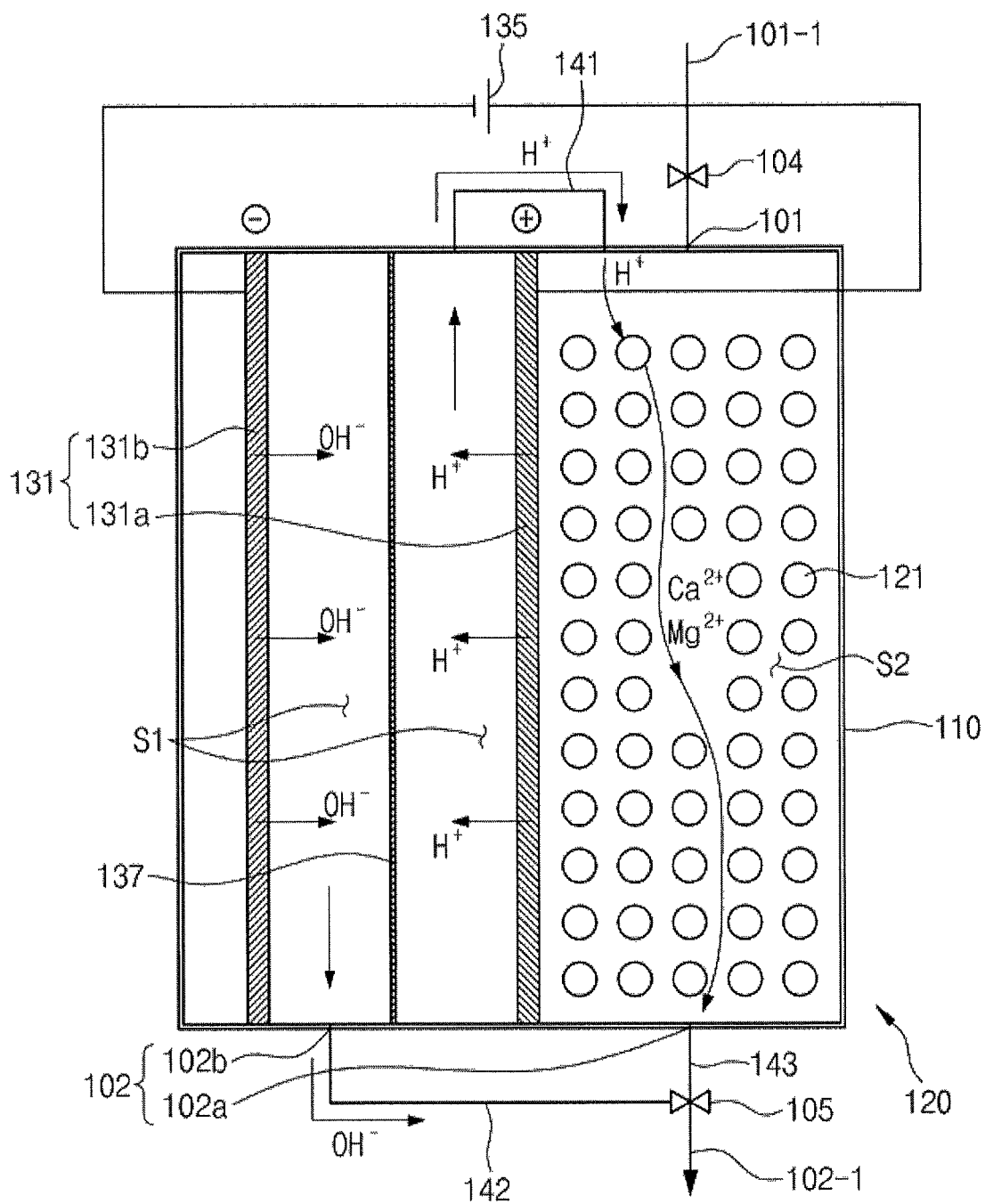
Figure 5:
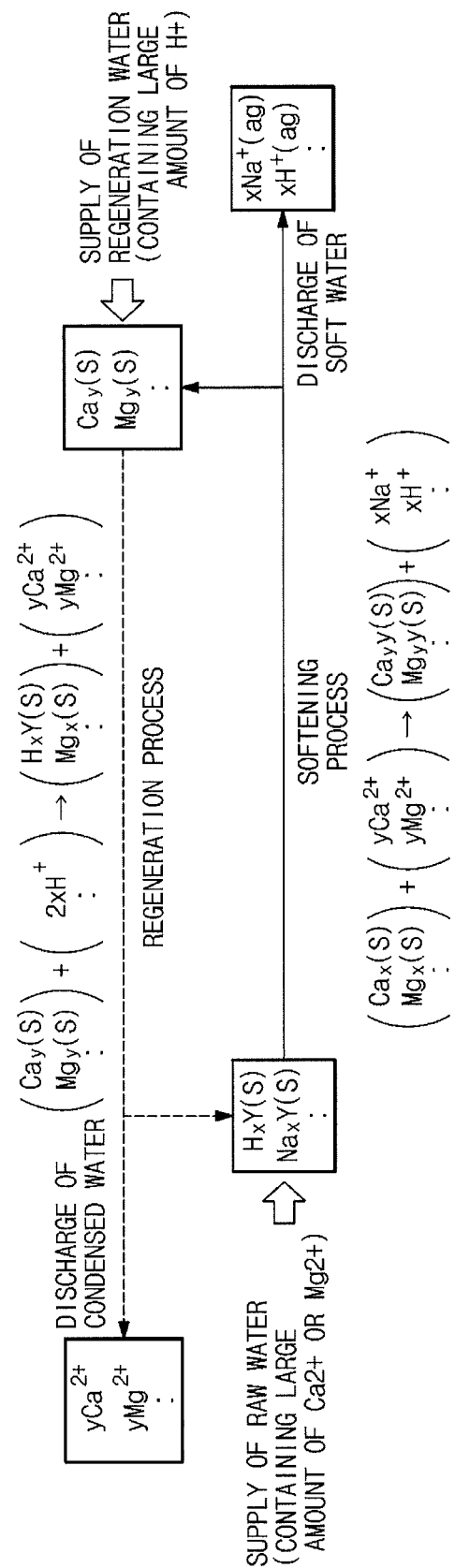
FIG. 5 is a view expressing the softening and regeneration processes shown in FIGS. 3 and 4 as a chemical formula.

FIG. 3 is a view showing a softening process of the softening apparatus 100, FIG. 4 is a view showing a regeneration process of the softening apparatus 100, and FIG. 5 is a view expressing the softening and regeneration processes performed in FIGS. 3 and 4 as a chemical formula.

Referring to FIG. 3, when raw water is introduced into the softening unit 120 through the inlet port 101, the raw water reaches the ion exchange body 121 disposed in the softening unit 120. When the raw water reaches the ion exchange body 121, a hardness component (Ca2+ or Mg2+) contained in the raw water is removed by the ion exchange body 121 and soft water is discharged through the first outlet port 102a of the housing 110. That is, the raw water softening process is performed such that the hardness component (Ca2+ or Mg2+) of the raw water is adsorbed by the ion exchange body 121 and, at the same time, a positive ion component is separated from the ion exchange body 121.

The principle of ion exchange in the ion exchange body 121 is related to the structure of the ion exchange body 121. Hereinafter, an ion exchange body 121 including zeolite particles will be described by way of example. A zeolite particle gas is a structure represented by structural formula 1.

Structural formula 1

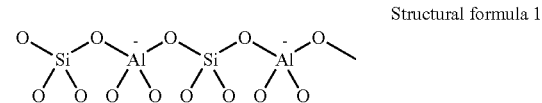

Referring to structural formula 1, the zeolite particle has silicon and aluminum as central atoms. Aluminum partially has negative charges. Consequently, the zeolite particle may adsorb positive ions having positive charges.

When raw water containing a hardness component (Ca2+ or Mg2+) is supplied to an initial zeolite particle coupled to hydrogen ions (H+) or sodium ions (Na+), ion exchange is performed between the hydrogen ions (H+) and the calcium ions (Ca2+) or the magnesium ions (Mg2+). In addition, ion exchange is performed between the sodium ions (Na+) and the calcium ions (Ca2+) or the magnesium ions (Mg2+).

Chemical reaction formulas 1 and 2 show a process in which the hardness component (Ca2+ or Mg2+) is adsorbed by the zeolite particle.

Chemical reaction formula 1

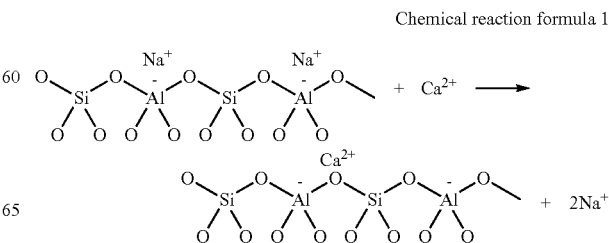

Chemical reaction formula 2

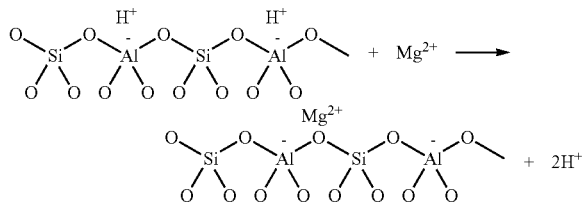

The initial zeolite particle may include sodium ions (Na+) or hydrogen ions (H+) based on kind thereof. However, the regeneration process is performed through ion exchange between high-concentration hydrogen ions (H+) generated during electrolysis of water and calcium ions (Ca2+) or magnesium ions (Mg2+). As the regeneration process and the softening process are repeatedly performed, ion exchange is repeatedly performed between the hydrogen ions (H+) and the calcium ions (Ca2+) or the magnesium ions (Mg2+). During ion exchange at the regeneration process and the softening process, the hydrogen ions (H+) are mainly intervened.

As concentration of hydrogen ions (H+) of water increases, pH of the water decreases and the water is acidified. Acid is corrosive. The ion exchange body 121 may be corroded due to such corrosiveness of acid. In the softening apparatus 100 according to this embodiment, zeolite is repeatedly regenerated and used for a long period of time. Consequently, zeolite stable against acid may be used as the ion exchange body 121.

When the softening process is performed for a predetermined amount of water, the regeneration process may be performed to remove impurities from the ion exchange body 121. That is, impurities, such as a hardness component (Ca2+ or Mg2+), may be removed from the ion exchange body 121 through the regeneration process such that the softening apparatus 100 is continuously usable. Hereinafter, a regeneration process of the softening apparatus 100 will be described with reference to FIG. 4.

When power is supplied to the anode 131a and the cathode 131b of the regeneration unit 130, as shown in FIG. 4, water is electrolyzed. As a result, a reaction represented by chemical reaction formula 3 occurs at the anode 131a and a reaction represented by chemical reaction formula 4 occurs at the cathode 131b.

$H_2O \rightarrow \frac{1}{2}O_2 + 2H^+ + 2e^-$ 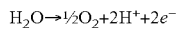 Chemical reaction formula 3 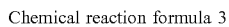

$2H_2O + 2e^- \rightarrow H_2 + 2OH^-$ 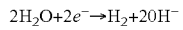 Chemical reaction formula 4 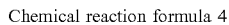

As represented by chemical reaction formulas 3 and 4, regeneration water having high concentration of hydrogen ions (H+) is generated by the anode 131a and alkaline water having high concentration of hydroxyl ions (OH−) is generated by the cathode 131b.

The regeneration water is supplied to the ion exchange body 121 through the first channel unit 141. In this case, calcium ions (Ca2+) or magnesium ions (Mg2+) adsorbed by the ion exchange body 121 are exchanged with the high-concentration hydrogen ions (H+) to regenerate the ion exchange body 121. On the other hand, the alkaline water is discharged outside through the second channel unit 142.

A softening and regeneration cycle as shown in FIG. 5 may be derived from a combination of the principles shown in FIGS. 3 and 4. In FIG. 5, a solid line indicates a softening process and a dotted line indicates a regeneration process.

An ion exchange body 121 including zeolite particles will be described by way of example with reference to FIG. 5.

Referring to FIG. 5, zeolite particles may have a form of HxY(s) or NaxY(s). When raw water containing a hardness component (Ca2+ or Mg2+) is supplied to zeolite particles of the softening unit 120, calcium ions (Ca2+) or magnesium ions (Mg2+) are adsorbed by the zeolite particles and, at the same time, a positive ion component, such as hydrogen ions (H+) or sodium ions (Na+), is separated from the ion exchange body 121. After completion of the softening process, therefore, soft water containing hydrogen ions (H+) or sodium ions (Na+) is discharged through the third channel unit 143.

After completion of the softening process, a regeneration process may be periodically performed as needed. The regeneration process uses high-concentration hydrogen ions (H+) generated during electrolysis of water. That is, a large amount of hydrogen ions (H+) are generated by the anode 131a side during electrolysis of water. The hydrogen ions (H+) are supplied to the ion exchange body 121 through the first channel unit 141 and are exchanged with the calcium ions (Ca2+) or magnesium ions (Mg2+) adsorbed by the ion exchange body 121 to regenerate the ion exchange body 121. After completion of the regeneration process, condensed water containing calcium ions (Ca2+) or magnesium ions (Mg2+) is discharged outside through the third channel unit 143.

Figure 6:
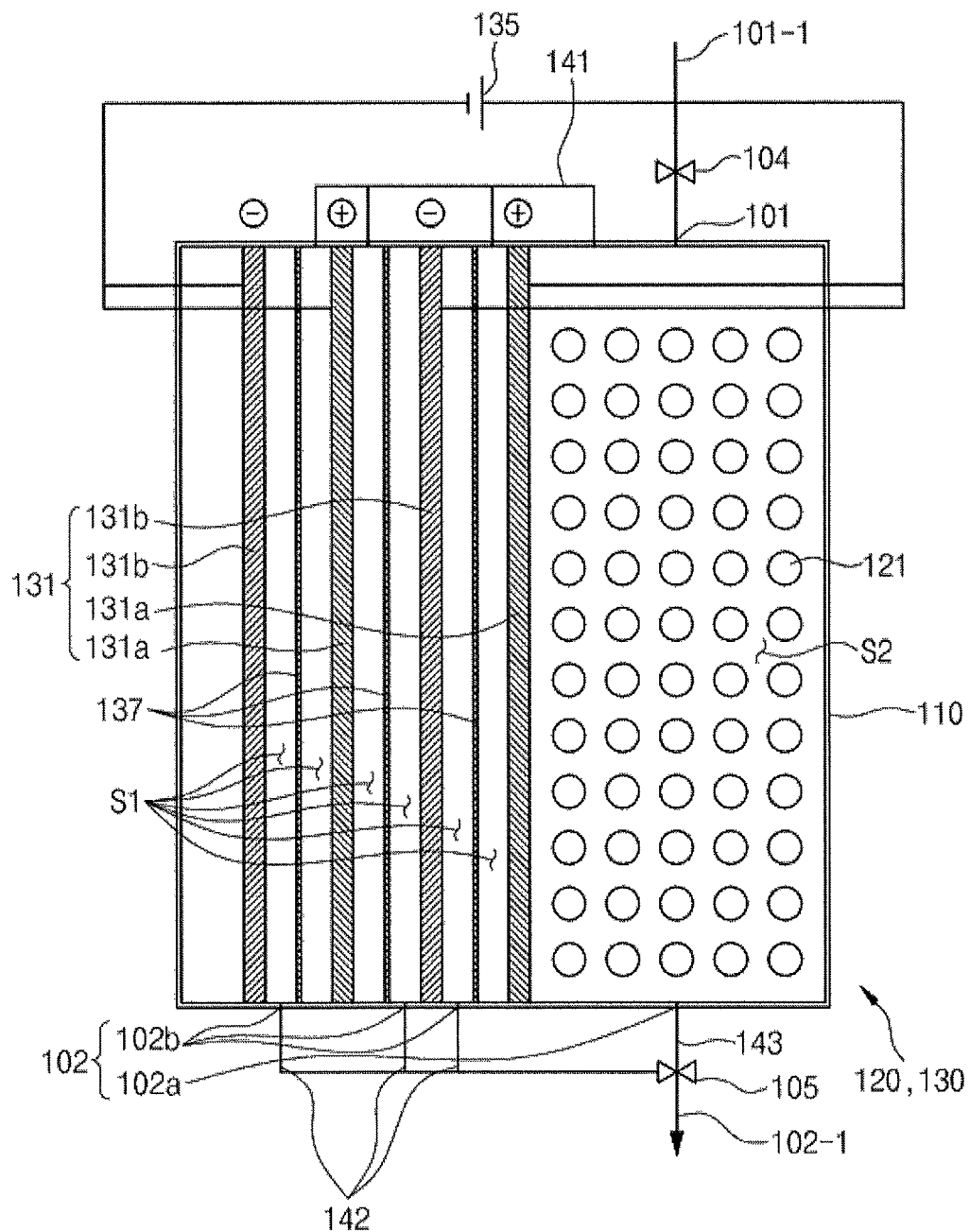
FIG. 6 is a sectional view showing a softening apparatus including plural pairs of plate-shaped electrodes according to an embodiment of the present disclosure.
Figure 7:
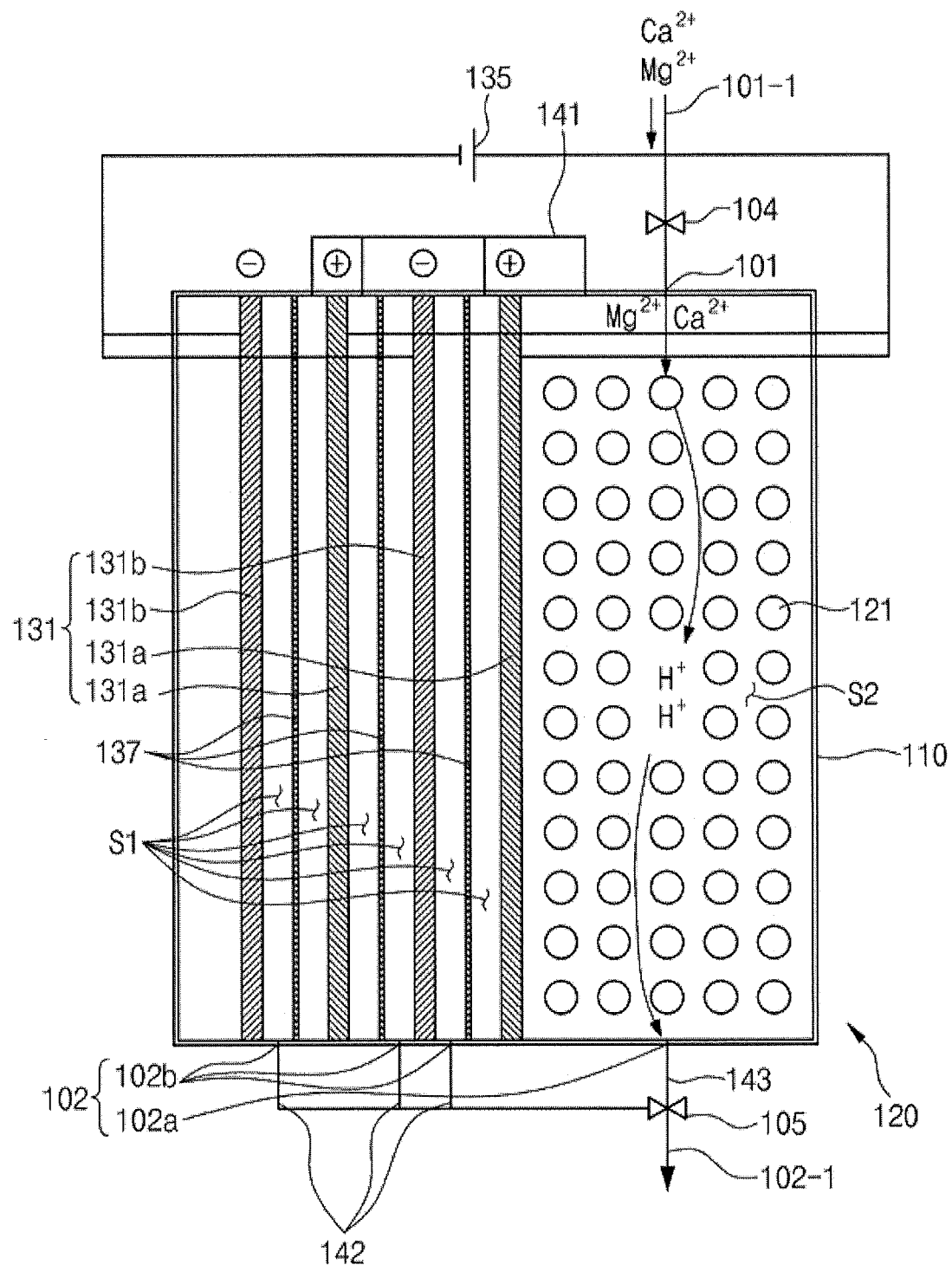
FIGS. 7 and 8 are views showing softening and regeneration processes of the softening apparatus shown in FIG. 6.
Figure 8:
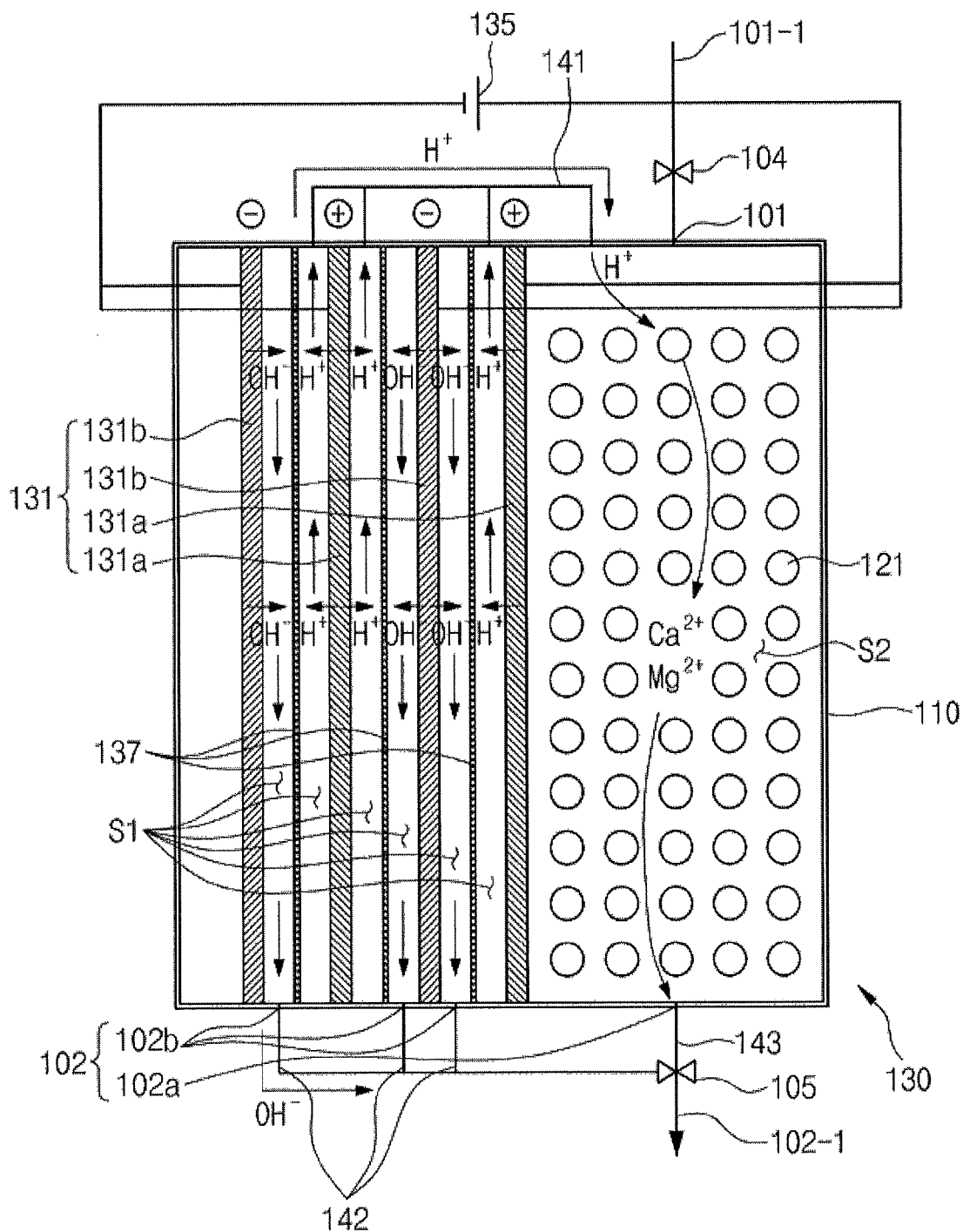

Next, a description will be given of a softening apparatus 100 including plural pairs of plate-shaped electrodes 131 according to an embodiment of the present disclosure. FIG. 6 is a sectional view showing a softening apparatus 100 including plural pairs of plate-shaped electrodes 131 according to an embodiment of the present disclosure and FIGS. 7 and 8 are views showing softening and regeneration processes of the softening apparatus 100 shown in FIG. 6.

Referring to FIG. 6, the softening apparatus 100 according to this embodiment includes plural pairs of plate-shaped electrodes 131 unlike the softening apparatus 100 shown in FIG. 2. In addition, at least one of the plate-shaped electrodes 131 may be made of an ion exchange material exhibiting conductivity.

Anodes 131a and cathodes 131b of the plate-shaped electrodes 131 are alternately arranged such that water passage spaces are defined between the anodes 131a and the cathodes 131b. In this embodiment, the water passage spaces are referred to as first spaces S1 and the interior of a housing 110 excluding the first spaces S1 is referred to as a second space S2. That is, the first spaces S1 and the second space S2 are defined based on arrangement of the electrodes 131.

As previously described, diaphragms 137 may be respectively disposed between the anodes 131a and the cathodes 131b to prevent a mixture of hydroxyl ions (OH−) generated by each cathode 131b and hydrogen ions (H+) generated by each anode 131a from being supplied to an ion exchange body 121. In this embodiment, the first spaces S1 are defined by the electrodes 131 and the diaphragms 137. Consequently, the first spaces S1 may be divided into a larger number of sub spaces than in FIG. 2.

In FIG. 6, two anodes 131a and two cathodes 131b are alternately arranged such that three diaphragms 137 are respectively disposed between the anodes 131a and the cathodes 131b. However, embodiments of the present disclosure are not limited thereto. A larger number of pairs of electrodes 131 may be used based on required capacity of the softening apparatus 100.

The softening and regeneration processes shown in FIGS. 7 and 8 are similar to those shown in FIGS. 3 and 4.

When raw water is introduced through an inlet port 101, as shown in FIG. 7, a hardness component (Ca2+ or Mg2+) contained in the raw water is adsorbed by the ion exchange body 121 and, at the same time, hydrogen ions (H+) or sodium ions (Na+) are separated from the ion exchange body 121. The separated hydrogen ions (H+) or sodium ions (Na+) are discharged outside through a first outlet port 102a. In this embodiment, the same softening process as in FIG. 3 is performed and, therefore, a description thereof will be omitted.

When the softening process is performed for a predetermined amount of water, a regeneration process may be performed to remove impurities from the ion exchange body 121. That is, impurities, such as a hardness component (Ca2+ or Mg2+), may be removed from the ion exchange body 121 through the regeneration process such that the softening apparatus 100 is continuously usable.

When power is supplied to the anodes 131a and the cathodes 131b of the regeneration unit during the regeneration process, water is electrolyzed to generate hydrogen ions (H+). The generated hydrogen ions (H+) are supplied to the ion exchange body 121 disposed in the second space S2 through a first channel unit 141 to regenerate the ion exchange body 121. In FIG. 7, hydrogen ions (H+) are generated by the plural anodes 131a. Consequently, the area to generate the hydrogen ions (H+) is larger than in FIG. 3, thereby achieving a higher regeneration effect.

Figure 9:
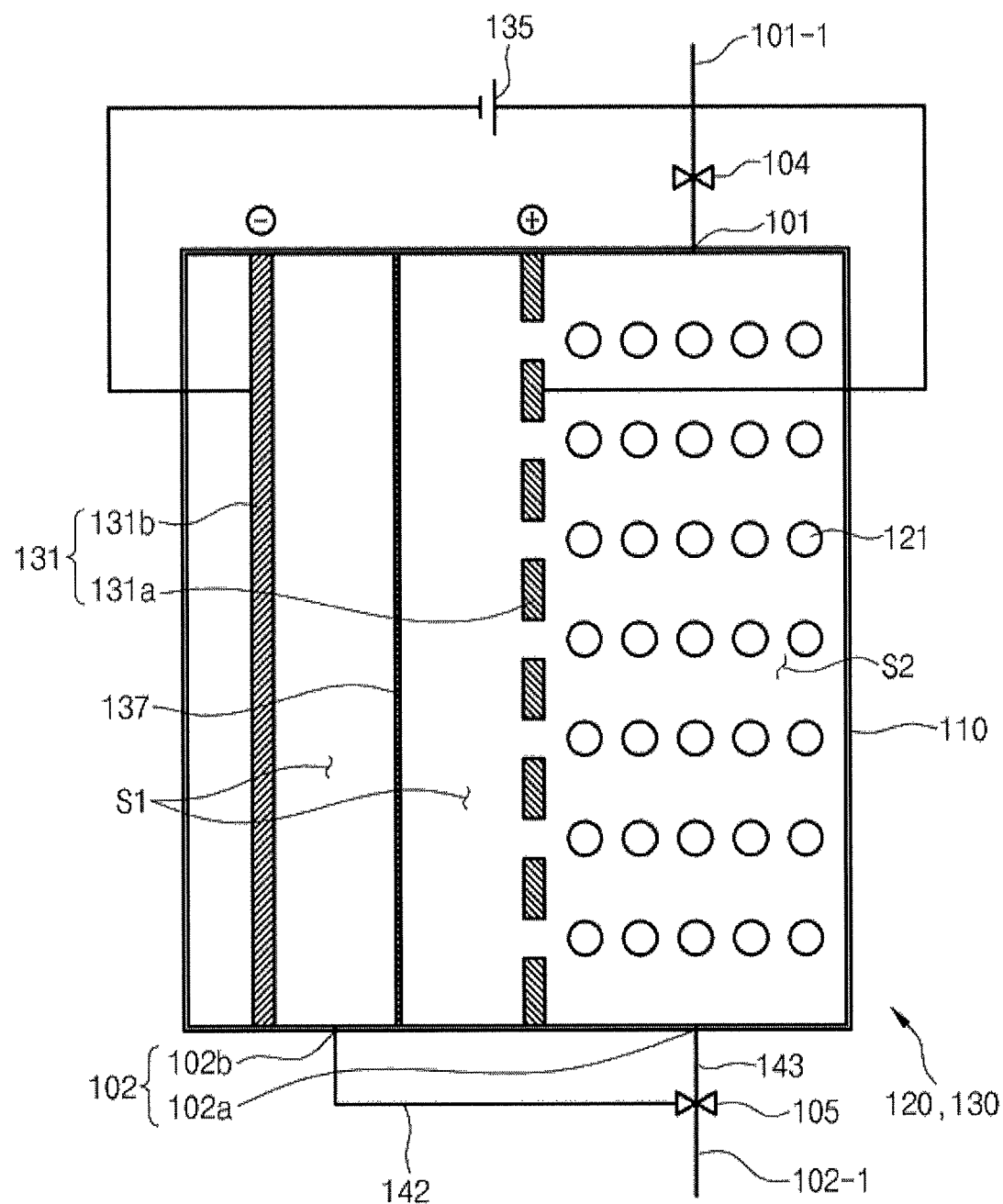
FIG. 9 is a sectional view showing a softening apparatus including plate-shaped mesh electrodes according to an embodiment of the present disclosure.
Figure 10:
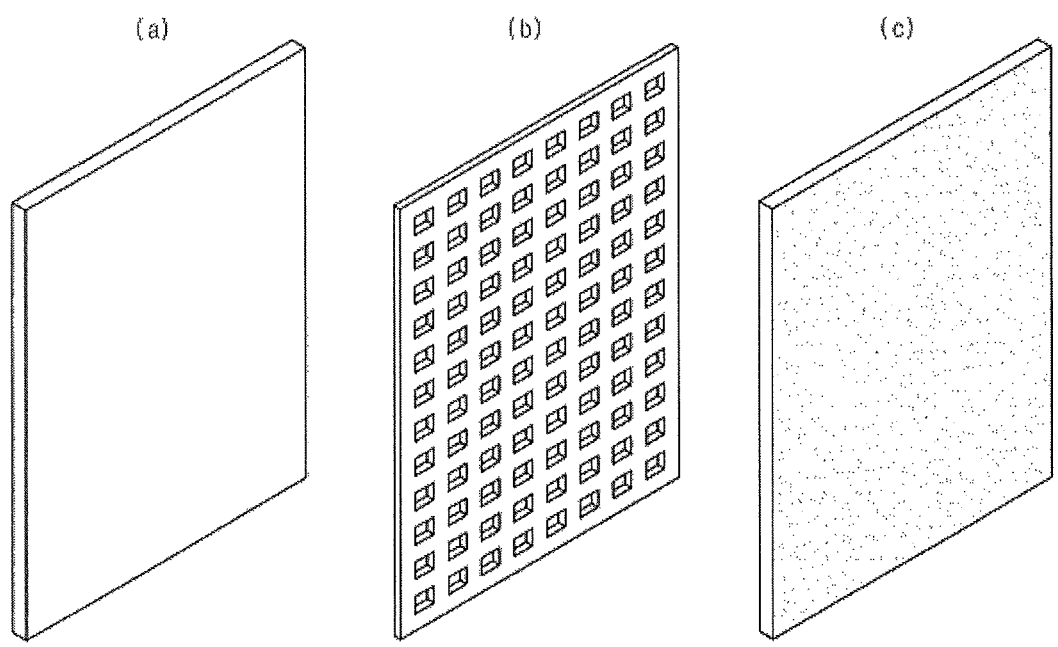
FIG. 10 is a view showing structures of a general plate-shaped electrode, plate-shaped mesh electrode, and plate-shaped porous electrode.
Figure 11:
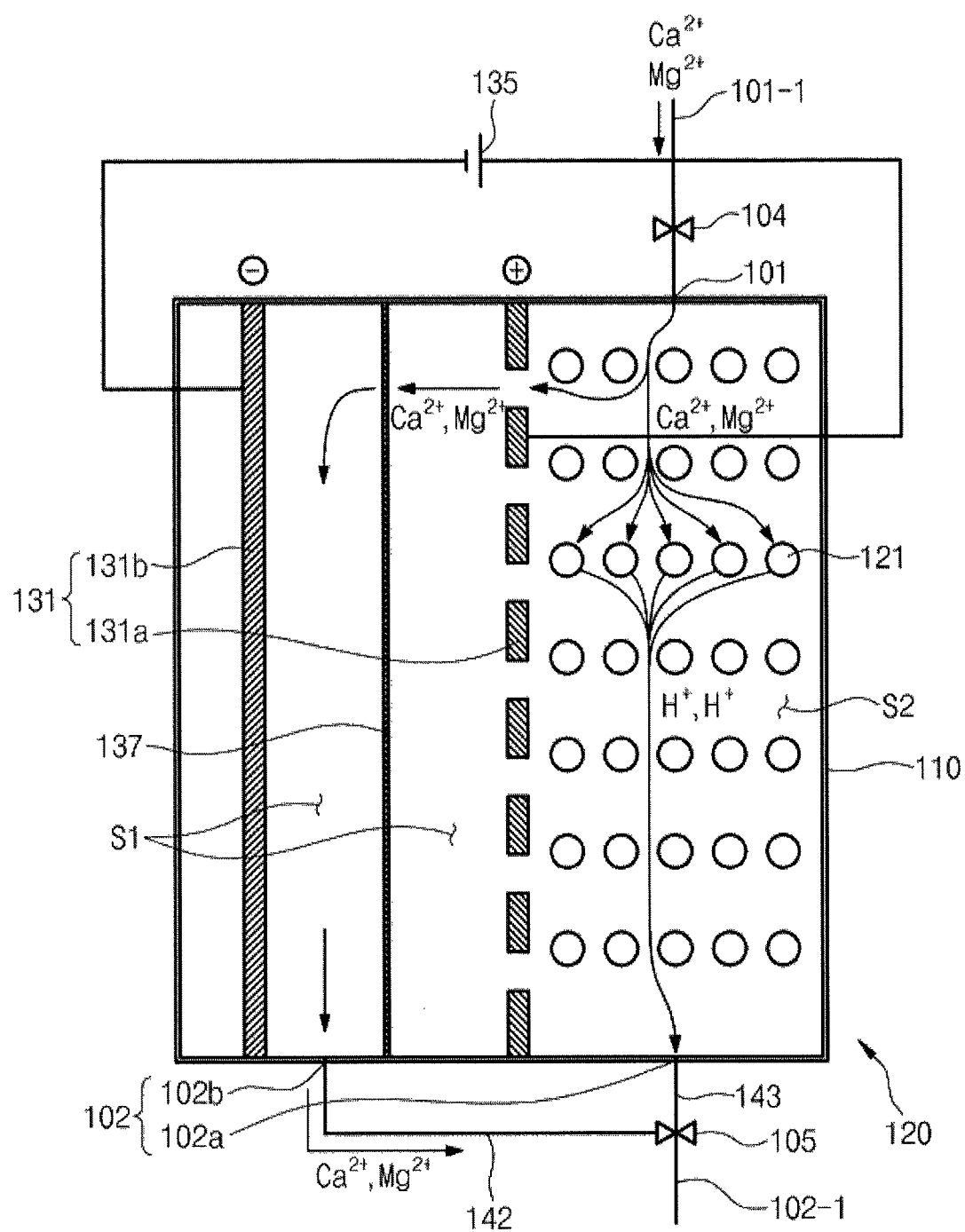
FIGS. 11 and 12 are views showing softening and regeneration processes of the softening apparatus shown in FIG. 9.
Figure 12:
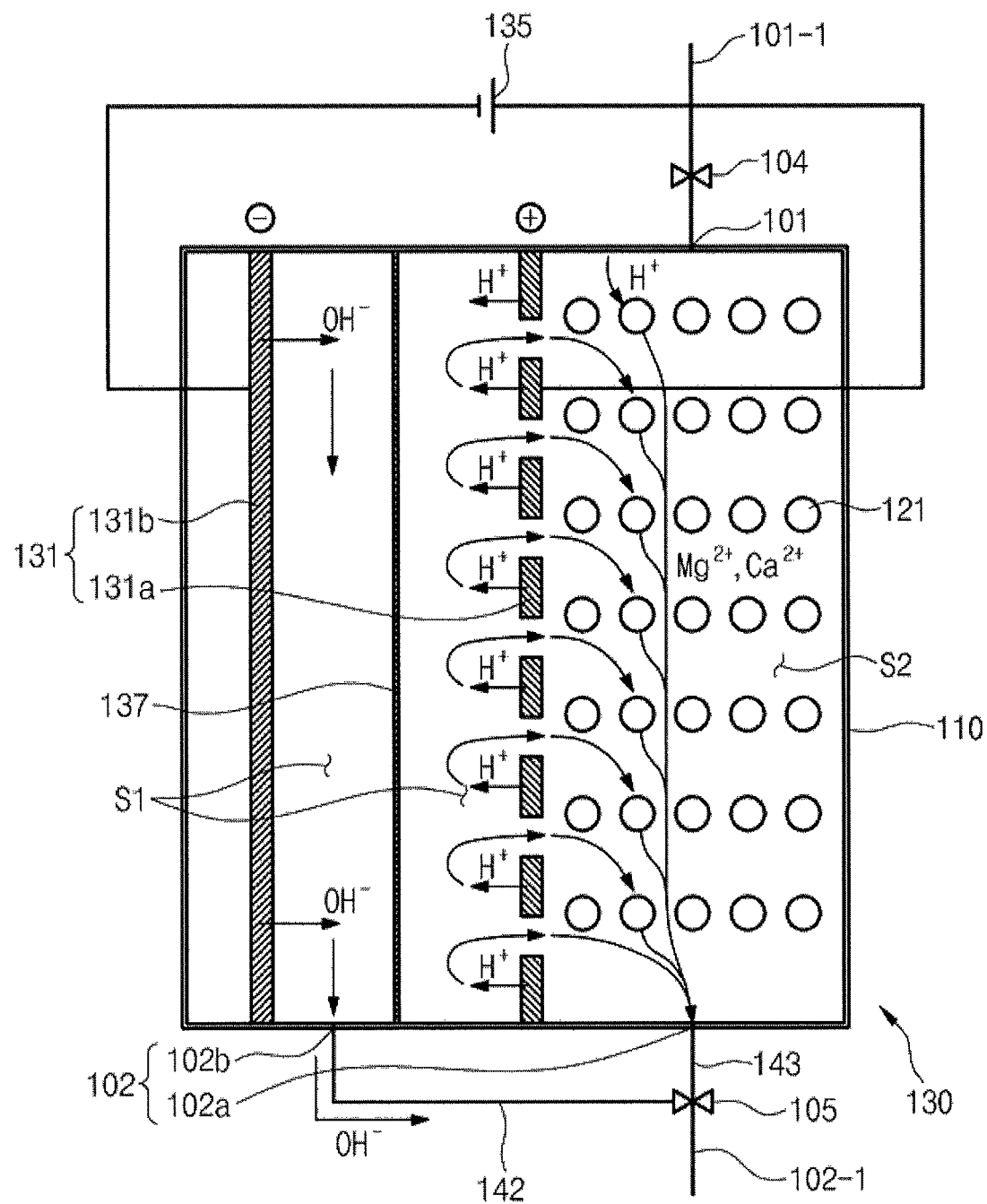

Next, a description will be given of a softening apparatus 100 including plate-shaped electrodes 131 according to an embodiment of the present disclosure. FIG. 9 is a sectional view showing a softening apparatus 100 including mesh electrodes 131 according to an embodiment of the present disclosure. FIG. 10(a) is a view showing the structure of a general plate-shaped electrode 131, FIG. 10(b) is a view showing the structure of a plate-shaped mesh electrode 131 as shown in FIG. 9, and FIG. 10(c) is a view showing the structure of a plate-shaped porous electrode 131. FIGS. 11 and 12 are views showing softening and regeneration processes of the softening apparatus 100 shown in FIG. 9.

Referring to FIG. 9, the softening apparatus 100 according to this embodiment includes mesh electrodes 131 unlike the softening apparatus 100 shown in FIG. 2. Hydrogen ions (H+) generated during a regeneration process move to an ion exchange body 121 by diffusion. More specifically, diffusion is a phenomenon in which particles are diffused from high concentration to low concentration. When regeneration water plentifully containing hydrogen ions (H+) is generated during the regeneration process, the concentration of the hydrogen ions (H+) in a first space S1 becomes higher than that of the hydrogen ions (H+) in a second space S2. As a result, the hydrogen ions (H+) move to the ion exchange body 121 in the second space S2. In this case, the regeneration water moves to the second space S2 through the mesh electrodes. Consequently, it may not be necessary to provide an additional channel to supply the regeneration water. As needed, however, a channel unit to move the hydrogen ions (H+) generated in the first space S1 to the second space S2 may be further provided In one example of this embodiment, the softening apparatus 100 may include a pair of porous electrodes 131 to easily diffuse hydrogen ions (H+). In an example of this embodiment, the softening apparatus 100 may include plural pairs of mesh or porous electrodes 131. In a further example of this embodiment, the softening apparatus 100 may include electrodes 131 made of an ion exchange material.

Hereinafter, structures of a general plate-shaped electrode 131, a mesh electrode 131, and a porous electrode 131 are compared with reference to FIG. 10.

As shown in FIG. 10(a), the general electrode 131 is manufactured by forming a conductor in a plate shape. In this case, the surface of the electrode 131 is smooth. Consequently, the electrode 131 may not transmit substances containing hydrogen ions (H+). For this reason, it may be necessary to provide an additional channel 141 to supply hydrogen ions (H+) generated during electrolysis to the ion exchange body 121 as shown in FIGS. 2 to 4 and 6 to 8.

When the electrode 130 is formed in a mesh or porous shape as shown in FIG. 10(b) or 10(c), substances containing hydrogen ions (H+) may be supplied to the ion exchange body 121 through a mesh or porous structure. Consequently, it may be unnecessary to provide an additional channel to supply regeneration water to the ion exchange body 121.

Hereinafter, an operation principle of the softening apparatus 100 including the mesh electrodes 131 shown in FIG. 9 will be described in detail with reference to FIGS. 11 and 12. The same operation principle may be applied to a softening apparatus 100 including porous electrodes 131. In addition, an operation principle of a softening apparatus 100 including a pair of electrodes 131 is identical to that of a softening apparatus 100 including plural pairs of electrodes 131. Consequently, a description thereof will be omitted.

When raw water is introduced through an inlet port 101, as shown in FIG. 11, a hardness component (Ca2+ or Mg2+) contained in the raw water is adsorbed by the ion exchange body 121 and, at the same time, hydrogen ions (H+) or sodium ions (Na+) are separated from the ion exchange body 121. The separated hydrogen ions (H+) or sodium ions (Na+) are discharged outside through a third channel unit 143. Meanwhile, some of the introduced hardness component (Ca2+ or Mg2+) may pass through a mesh anode 131a via a diaphragm 137 and may be introduced into the first space S1. The hardness component (Ca2+ or Mg2+) introduced into the first space S1 may pass through the diaphragm 137 and may be discharged outside through the second channel unit 142.

When the softening process is performed for a predetermined amount of water, a regeneration process may be performed to remove impurities from the ion exchange body 121.

When power is supplied to the anode 131a and the cathode 131b of the regeneration unit to perform the regeneration process, as shown in FIG. 12, water is electrolyzed and hydrogen ions (H+) are generated by the anode 131a. In this embodiment, the hydrogen ions (H+) are directly supplied to the ion exchange body 121 through the anode 131a since the anode 131a is formed in the mesh shape. In this case, the hydrogen ions (H+) move through the space between the electrodes 131, not through an additional channel (see e.g., first channel unit 141 in FIGS. 2 and 6). That is, the movement route is shorter than in FIGS. 2 and 6. Consequently, regeneration time may be reduced and cost related to such an additional channel may be reduced. Meanwhile, some of the hydrogen ions (H+) generated by the anode 131a may move to the cathode 131b through the diaphragm. However, the amount of the hydrogen ions (H+) moved to the cathode 131b is very less than that of the hydrogen ions (H+) diffused into the second space S2 and, therefore, a description thereof will be omitted.

Figure 13:
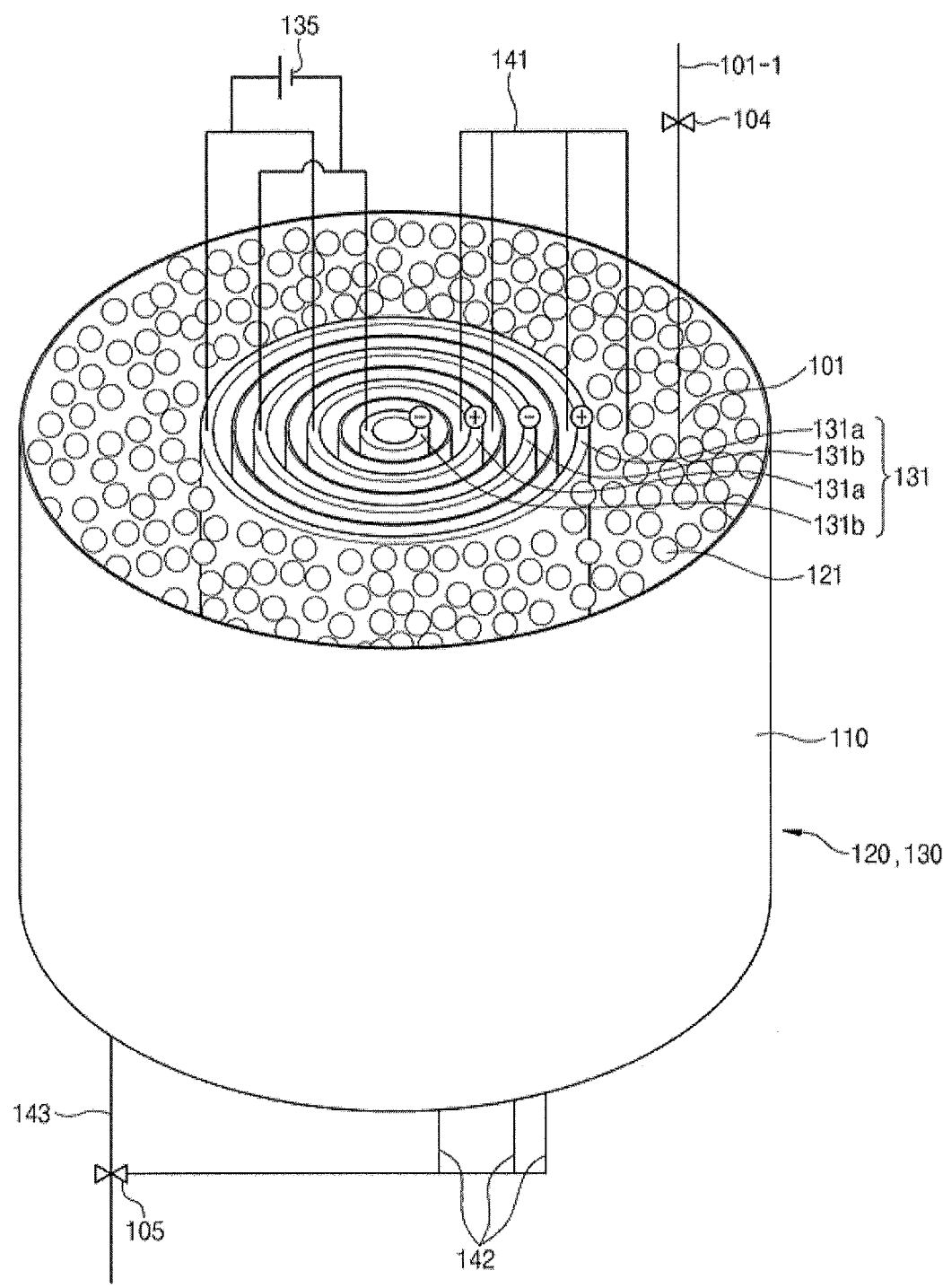
FIG. 13 is a sectional view showing a softening apparatus including plural pairs of circular electrodes according to a further embodiment of the present disclosure.

Next, a detailed description will be given of a softening apparatus 100 including circular electrodes 131 according to a further embodiment of the present disclosure. FIG. 13 is a sectional view showing a softening apparatus 100 including plural pairs of circular electrodes 131 according to a further embodiment of the present disclosure and FIGS. 14 and 15 are views showing softening and regeneration processes of the softening apparatus 10 shown in FIG. 13.

In this embodiment, the softening apparatus 100 may include at least one pair of circular electrodes 131. In FIG. 13, pluralities of anodes 131*a* and cathodes 131*b* are alternately arranged to define a plurality of spaces therebetween. The spaces are referred to as first spaces S1 and the remaining portion excluding the first spaces S1 is referred to as a second space S2. In FIG. 13, two anodes 131*a* and two cathodes 131*b* are alternately arranged. However, embodiments of the present disclosure are not limited thereto. A larger number of pairs of electrodes 131 may be used based on required capacity of the softening apparatus 100.

Hereinafter, an operation principle of the softening apparatus 100 shown in FIG. 13 will be described in detail with reference to FIGS. 14 and 15. The same operation principle may be applied to a softening apparatus 100 including one anode 131*a* and one cathode 131*b* and a softening apparatus 100 including electrodes 131 made of an ion exchange material. Consequently, a description thereof will be omitted.

Figure 14:
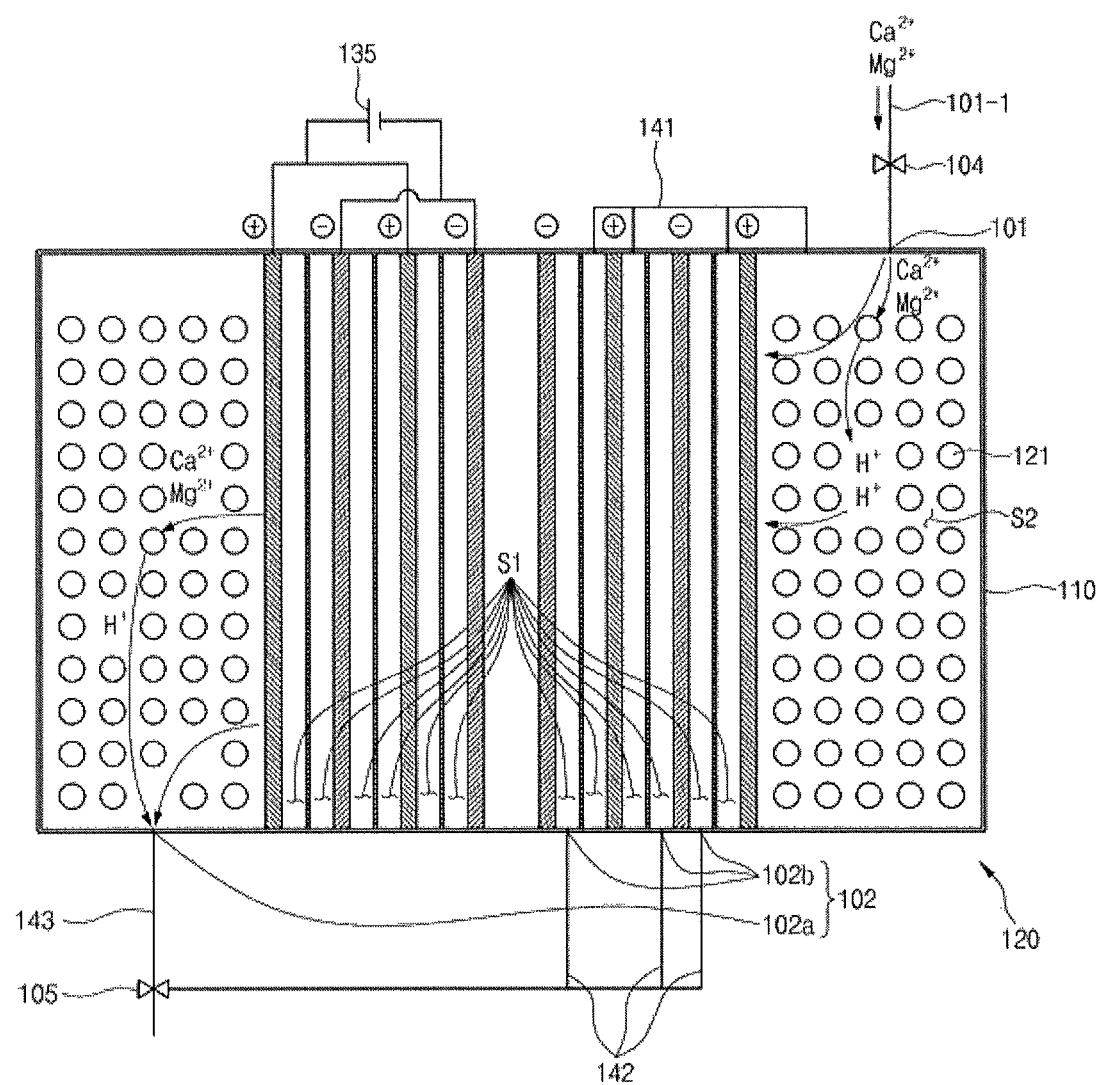
FIGS. 14 and 15 are views showing softening and regeneration processes of the softening apparatus shown in FIG. 13.
Figure 15:
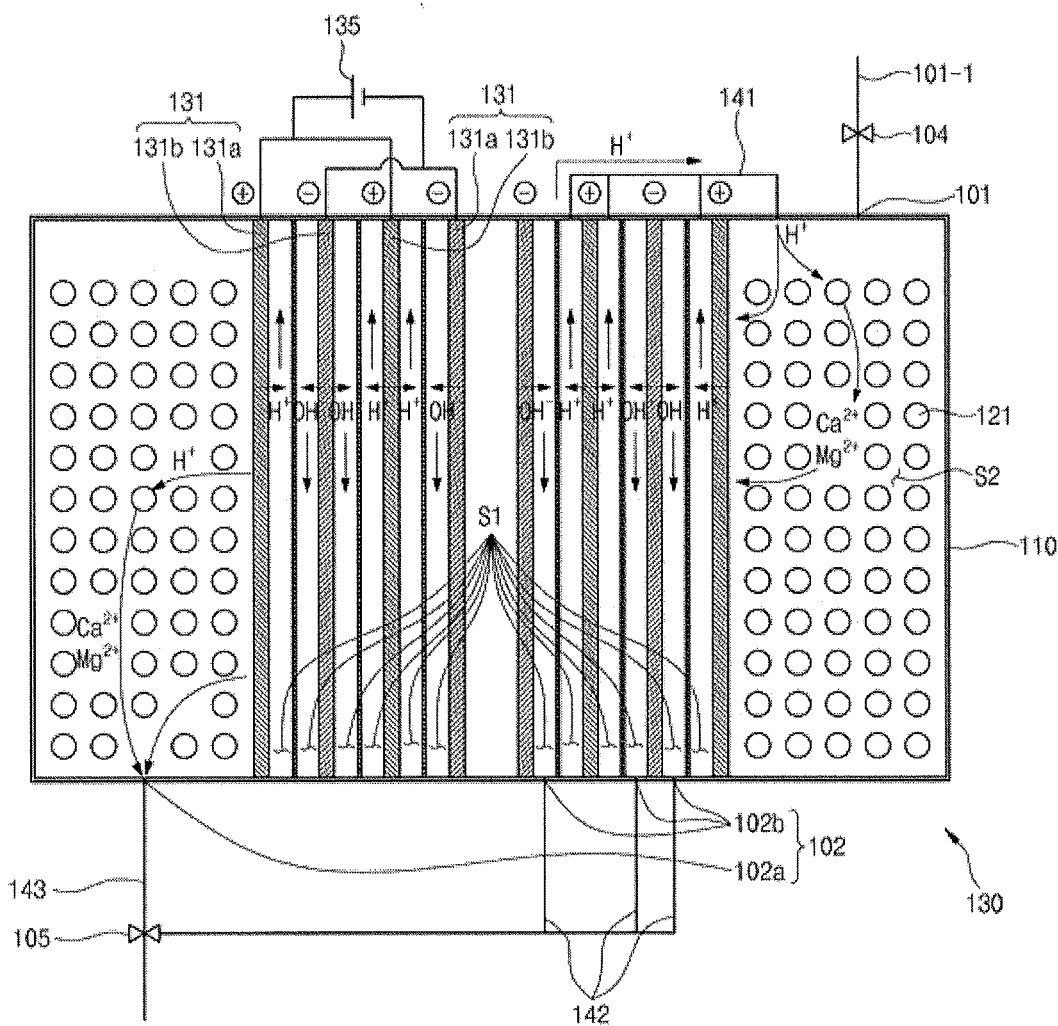

When raw water is introduced through an inlet port 101, as shown in FIG. 14, a hardness component ($Ca^{2+}$ or $Mg^{2+}$) contained in the raw water is adsorbed by an ion exchange body 121 and, at the same time, hydrogen ions ($H+$) or sodium ions ($Na+$) are separated from the ion exchange body 121. The separated hydrogen ions ($H+$) or sodium ions ($Na+$) are discharged outside through a third channel unit 143.

When the softening process is performed for a predetermined amount of water, a regeneration process may be performed to remove impurities from the ion exchange body 121.

When power is supplied to the anodes 131*a* and the cathodes 131*b* of the regeneration unit during the regeneration process, as shown in FIG. 15, water is electrolyzed and hydrogen ions ($H+$) are generated by the anodes 131*a*. The generated hydrogen ions ($H+$) are supplied to the ion exchange body 121 disposed in the second space S2 through a first channel unit 141 to regenerate the ion exchange body 121. In FIG. 15, hydrogen ions ($H+$) are generated by the plural anodes 131*a* in the same manner as in FIG. 7. Consequently, the area to generate the hydrogen ions ($H+$) is larger than in FIG. 3 or one pair of circular electrodes 131, thereby achieving a higher regeneration effect.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A softening apparatus comprising:
    a regenerator comprising a first space defined between an anode and a cathode to generate regeneration water containing hydrogen ions ($H+$); and
    a softener disposed in a second space partitioned from the first space, the softener having an ion exchange body regenerated by the regeneration water; and
    at least one channel unit to guide the regeneration water from the first space to the second space,
    wherein the first space and the second space are partitioned from each other at the anode, the anode being a boundary between the first space and the second space.

2. The softening apparatus according to claim 1, wherein the first space and the second space are provided in one housing.

3. The softening apparatus according to claim 1, wherein the ion exchange body comprises at least one selected from the group consisting of an organic compound comprising an ion exchange resin, an inorganic compound comprising zeolite, and a hybrid compound constituted by a mixture of the organic compound and the inorganic compound.

4. The softening apparatus according to claim 1, wherein the regenerator further comprises a diaphragm disposed between the anode and the cathode to selectively transmit ions.

5. The softening apparatus according to claim 4, wherein the diaphragm is selected from the group consisting of non-woven fabric, membrane, and positive ion exchange film.

6. The softening apparatus according to claim 1, wherein the first space is divided into a plurality of sub spaces by pluralities of anodes and cathodes.

7. The softening apparatus according to claim 1, wherein the anode and the cathode are formed in a plate shape or a circular shape.

8. The softening apparatus according to claim 1, wherein the at least one channel unit comprises:
    a first channel unit to guide regeneration water generated by the anode in the first space to the second space;
    a second channel unit to guide alkaline water generated by the cathode in the first space to be discharged outside; and
    a third channel unit to guide condensed water or soft water generated in the second space to be discharged outside.

9. The softening apparatus according to claim 1, wherein the anode is formed of a porous structure or a mesh structure.

10. The softening apparatus according to claim 1, wherein the anode is made of an ion exchange material.

11. The softening apparatus according to claim 1, further comprising a power supply assembly,
    wherein the regenerator generates the regeneration water containing hydrogen ions ($H+$) when power from the power supply assembly is supplied to the anode and cathode.

12. The softening apparatus according to claim 1, wherein the regenerator further comprises a plurality of diaphragms disposed between the anode and the cathode to selectively transmit ions.

13. The softening apparatus according to claim 1, wherein the cathode generates alkaline water.

14. A softening apparatus comprising:
    a regenerator comprising a first space defined between an anode and a cathode to generate regeneration water containing hydrogen ions ($H+$); and
    a softener disposed in a second space partitioned from the first space, the softener having an ion exchange body regenerated by the regeneration water; and
    at least one channel unit to guide the regeneration water from the first space to the second space,
    wherein the ion exchange body is disposed in the second space such that the ion exchange body is coupled to one side of the anode via a binder.

15. The softening apparatus according to claim 14, wherein the binder is at least one selected from the group consisting of an inorganic binder and a porous binder.

* * * * *